(12) United States Patent
Yasui

(10) Patent No.: US 9,404,576 B2
(45) Date of Patent: Aug. 2, 2016

(54) ACTUATOR

(71) Applicant: NABTESCO CORPORATION, Tokyo (JP)

(72) Inventor: Tsutomu Yasui, Gifu (JP)

(73) Assignee: NABTESCO CORPORATION, Tokyo (JP)

( * ) Notice: Subject to any disclaimer, the term of this patent is extended or adjusted under 35 U.S.C. 154(b) by 574 days.

(21) Appl. No.: 13/693,949

(22) Filed: Dec. 4, 2012

(65) Prior Publication Data

US 2013/0340547 A1   Dec. 26, 2013

(30) Foreign Application Priority Data

Dec. 6, 2011   (JP) ................... 2011-266917

(51) Int. Cl.
*F16H 3/06*      (2006.01)
*F16H 27/02*     (2006.01)
*F16H 29/02*     (2006.01)
*F16H 29/20*     (2006.01)
(Continued)

(52) U.S. Cl.
CPC . *F16J 1/10* (2013.01); *F16H 21/18* (2013.01); *F16H 25/20* (2013.01); *F16H 25/2454* (2013.01); *H02K 7/06* (2013.01); *F16H 2025/2081* (2013.01); *F16H 2025/2087* (2013.01); *Y10T 74/18248* (2015.01)

(58) Field of Classification Search
CPC .......... F16J 1/10; F16H 25/2454; F16H 25/20
USPC ................ 74/89.23, 89.38, 89.39, 424.71; 384/255, 906
See application file for complete search history.

(56) References Cited

U.S. PATENT DOCUMENTS 4,679,451 A * 7/1987 Nakamura .............. F16H 25/20
                                              74/606 R
4,889,002 A * 12/1989 Abraham ............ F16H 25/2015
                                              310/78

(Continued)

FOREIGN PATENT DOCUMENTS

JP     H7-11870 U     2/1995
JP     H08-121560 A   5/1996
JP     2002-156069 A  5/2002

OTHER PUBLICATIONS

Stephen C. Jenson et al.; "Flight Test Experience with an Electromechanical Actuator on the F-18 Systems Research Aircraft"; published at NASA.org.

(Continued)

*Primary Examiner* — William Kelleher
*Assistant Examiner* — Jake Cook
(74) *Attorney, Agent, or Firm* — Studebaker & Brackett PC

(57) ABSTRACT

A linear drive portion is fixed to a piston. A nut portion and a screw portion relatively rotate, and a direction of action of driving force is converted between a rotational direction and a linear direction. The piston is installed within a case. The inner circumference of a piston sliding portion fixed within the case slidably supports the outer circumference of the piston. The nut portion is displaced with the piston, and the screw portion rotates in conjunction with a rotational drive portion. The piston is installed so as to be able to slide in the axial direction of the case with respect to the piston sliding portion. The axis of the piston and the central position of the inner circumference of the piston sliding portion are set to be eccentric with respect to the axis of the screw portion and the nut portion.

6 Claims, 8 Drawing Sheets

(51) Int. Cl.
*F16J 1/10* (2006.01)
*F16H 25/24* (2006.01)
*H02K 7/06* (2006.01)
*F16H 21/18* (2006.01)
*F16H 25/20* (2006.01)

(56) References Cited

U.S. PATENT DOCUMENTS

| | | | | |
|---|---|---|---|---|
| 5,111,708 | A | 5/1992 | Brusasco | |
| 5,791,433 | A * | 8/1998 | Murakami | B62D 6/02 180/417 |
| 6,067,868 | A * | 5/2000 | Nakamura | F16H 25/20 74/89.35 |
| 6,240,797 | B1 * | 6/2001 | Morishima et al. | 74/89.39 |
| 6,389,915 | B1 * | 5/2002 | Wngett | B64C 13/00 74/424.71 |
| 8,015,889 | B2 * | 9/2011 | Wingett | F16H 25/20 384/507 |
| 2009/0044646 | A1 * | 2/2009 | Duck et al. | 74/89.39 |
| 2009/0260463 | A1 * | 10/2009 | Fukano | F16H 25/2454 74/89.33 |
| 2010/0107790 | A1 * | 5/2010 | Yamaguchi | 74/89.38 |

OTHER PUBLICATIONS

The extended European Search Report dated Feb. 27, 2013, which corresponds to European Patent Application No. 12195893.8-1753 and is related to U.S. Appl. No. 13/693,949.

* cited by examiner

ACTUATOR

CROSS-REFERENCE TO RELATED APPLICATION

This application claims priority to Japanese Patent Application No. 2011-266917. The entire disclosure of Japanese Patent Application No. 2011-266917 is hereby incorporated herein by reference.

BACKGROUND OF THE INVENTION

1. Field of the Invention

The present invention relates to actuators that convert a direction of action of driving force between a rotational direction and a linear direction and drive equipment.

2. Description of the Related Art

Conventionally, as actuators for driving various kinds of equipment in different fields such as, for example, in the field of aircrafts, actuators that convert a direction of action of driving force between a rotational direction and a linear direction and drive equipment are used.

U.S. Pat. No. 5,111,708 discloses an actuator that transmits, via a driving belt mechanism, rotational driving force generated by an electric motor, further converts this rotational driving force into linear driving force by a ball screw mechanism, and outputs the linear driving force. A literature titled "FLIGHT TEST EXPERIENCE WITH AN ELECTROMECHANICAL ACTUATOR ON THE F-18 SYSTEMS RESEARCH AIRCRAFT" published on the NASA website also discloses an actuator that converts rotational driving force generated by an electric motor into linear driving force by a ball screw mechanism, and outputs the linear driving force. Note that the above NASA literature is published on the Internet at the URL: http://www.nasa.gov/centers/dryden/pdf/88699main_H-2425.pdf.

Such an actuator as one disclosed in U.S. Pat. No. 5,111,708 or the above NASA literature is provided with a driving force conversion mechanism, such as a ball screw mechanism, for converting the direction of action of driving force between a rotational direction and a linear direction and transmitting the driving force. This driving force conversion mechanism, which is provided with a nut portion and a screw portion, converts the direction of action of driving force as a result of relative rotation of the nut portion and the screw portion.

In the above-mentioned driving force conversion mechanism, one of the nut portion and the screw portion rotates, and the other is linearly displaced. Therefore, a mechanism for restricting rotation of a linearly displaced element, which is one of one of the nut portion and the screw portion, is necessary. Note that the above NASA literature mentions that, to restrict the rotation of the screw portion that is linearly displaced in the ball screw mechanism, a rotation regulator to be built in or externally installed is separately needed.

SUMMARY OF THE INVENTION

With such an actuator as one disclosed in U.S. Pat. No. 5,111,708 or the above NASA literature, the driving force conversion mechanism needs the rotation restriction mechanism for restricting rotation of the linearly displaced element, which is one of the nut portion and the screw portion. This rotation restriction mechanism, which is built as a structure capable of restricting the rotation of one of the nut portion and the screw portion, would cause the actuator to become larger, and cause the structure thereof to become more complicated. Moreover, a larger actuator would result in increase in the weight thereof. Furthermore, a larger actuator would also result in more constraints on the installation space for the actuator. Consequently, an actuator whose rotation restriction mechanism can be made simpler and smaller and whose installation space can be made more compact is desired.

In light of the foregoing situation, it is an object of the present invention to provide an actuator whose mechanism for restricting rotation of a linearly displaced element that is one of the nut portion and the screw portion can be made simpler and smaller, whose structure can be made simpler and smaller, and whose installation space can be made more compact.

The actuator according to a first feature of the present invention for achieving the above-stated object is an actuator that converts a direction of action of driving force between a rotational direction and a linear direction and drive equipment, the actuator comprising: a rotational drive portion that generates or outputs rotational driving force; a linear drive portion that outputs linear driving force when the rotational drive portion generates the rotational driving force, or generates linear driving force when the rotational drive portion outputs the rotational driving force; a piston integrated with, or fixed to, the linear drive portion; a driving force conversion mechanism that has a nut portion and a screw portion, and converts a direction of action of the driving force between a rotational direction and a linear direction and transmits the driving force as a result of relative rotation of the nut portion and the screw portion; a case that has a tubular portion and within which the piston and the driving force conversion mechanism are installed; and a piston sliding portion that is provided within the case and integrated with, or fixed to, the case, and has an inner circumference slidably supporting an outer circumference of the piston, wherein one of the nut portion and the screw portion is provided so as to be displaced with the piston, the other of the nut portion and the screw portion is provided so as to rotate with the rotational drive portion, or rotate in conjunction with the rotational drive portion via a rotational driving force transmission mechanism, the piston is installed so as to be able to slide in an axial direction of the case with respect to the piston sliding portion, and an axis of the piston and a central position of the inner circumference of the piston sliding portion are set to be eccentric with respect to an axis of the screw portion and an axis of the nut portion.

With this configuration, the piston integrated with, or fixed to, the linear drive portion is installed so as to be able to slide in the axial direction with respect to the piston sliding portion integrated with, or fixed to, the case. The axis of this piston and the central position of the inner circumference of the piston sliding portion that slidably supports the outer circumference of the piston are set to be eccentric with respect to the axis of the screw portion and the nut portion. Therefore, rotational displacement of the piston around its axis is restricted, and rotation of the piston around the axis of the nut portion and the screw portion is also restricted. Thus, the piston restricts rotation of, and is linearly displaced with, one of the nut portion and the screw portion when the other rotates. Accordingly, the mechanism for restricting rotation of the linearly displaced element, which is one of the nut portion and the screw portion, can be configured by the piston whose axis is eccentric with respect to the screw portion and the nut portion within the case, and thus can be made simpler and smaller. Consequently, because of the above configuration, the structure of the actuator can be made simpler and smaller, increase in the weight of the actuator can be suppressed, and the installation space for the actuator can be made more compact.

Accordingly, with the above configuration, it is possible to provide an actuator whose mechanism for restricting rotation of the linearly displaced element that is one of the nut portion and the screw portion can be made simpler and smaller, whose structure can be made simpler and smaller, and whose installation space can be made more compact.

The actuator according to a second feature of the present invention is the actuator of the first feature, wherein the piston sliding portion is provided as a bush installed as a cylindrical sliding member having a circular cross section between the case and the piston, the bush has an inner circumference that is slidable with respect to the outer circumference of the piston, and an outer circumference fixed to the case, and a central position of the inner circumference of the bush is eccentric with respect to a central portion of the outer circumference of the bush.

With this configuration, it is possible to easily achieve the piston sliding portion for supporting the piston, whose axis is eccentric with respect to the nut portion and the screw portion, in a state where the piston can slide in the axial direction with respect to the case and rotational displacement of the piston is restricted. In other words, the above-described mechanism can be easily achieved only by installing, between the case and the piston, the bush whose central position of the inner circumference is eccentric with respect to the central position of the outer circumference. Consequently, the mechanism for restricting the linearly displaced element that is one of the nut portion and the screw portion can be made further simpler and smaller. Furthermore, with the above configuration, it is possible to establish the mechanism for restricting the above-described rotation by placing the bush, which constitutes the piston sliding portion, between the case and the piston, and therefore, assembly can also be easily performed.

The actuator according to a third feature of the present invention is the actuator of the second feature, wherein the outer circumference of the bush is fixed to an inner circumference of the case by a key coupling.

With this configuration, the bush can be easily fixed by a key coupling within the case. Accordingly, it is possible to further easily achieve the mechanism for installing the piston, whose axis is eccentric with respect to the nut portion and the screw portion, in a state where the piston can slide in the axial direction with respect to the case and rotational displacement of the piston is restricted, and the mechanism can be made further simpler and smaller. Furthermore, the bush can be further easily installed within the case.

The actuator according to a fourth feature of the present invention is the actuator of the first feature, wherein the piston has a tubular portion, and internally houses the driving force conversion mechanism.

With this configuration, the driving force conversion mechanism is housed within the cylindrical piston, and it is therefore possible to easily prevent foreign matter from entering the area where the nut portion and the screw portion are installed. It is thus possible to suppress occurrence of a jammed state due to foreign matter stuck in the nut portion and the screw portion. Furthermore, the area within the piston is efficiently used, and it is therefore possible to provide a further compact, space-efficient actuator whose structure is further made smaller.

The actuator according to a fifth feature of the present invention is the actuator of the first feature, wherein the rotational drive portion generates rotational driving force, and the linear drive portion outputs linear driving force.

With this configuration, the structure of the actuator that converts the direction of action of rotational driving force and outputs linear driving force can be made simpler and smaller. Furthermore, with this configuration, one of the nut portion and the screw portion and the piston that is displaced with the linear drive portion are provided on the output side in a driving force transmission path. Therefore, a force generated in a rotational direction around the axis of the nut portion and the screw portion by a large driving force acting on the output side in the driving force transmission path can be efficiently distributed and supported on the inner circumference of the cylindrical piston case.

It should be appreciated that the above and other objects, features and advantages of the present invention will become apparent from the following description taken in conjunction with the accompanying drawings.

DETAILED DESCRIPTION OF THE INVENTION

An embodiment for implementing the present invention will be hereinafter described with reference to the drawings. The following embodiment will be described, taking, as an example, a mode in which an actuator is used as a moving surface driving device for aircrafts for driving a moving surface of an aircraft. However, the present invention is not limited to the mode taken as an example in the following embodiment, and can be widely applied to actuators that convert a direction of action of driving force between a rotational direction and a linear direction and drive equipment. For example, the present invention can be applied to actuators used in aircrafts, helicopters, or flying objects.

Figure 1:
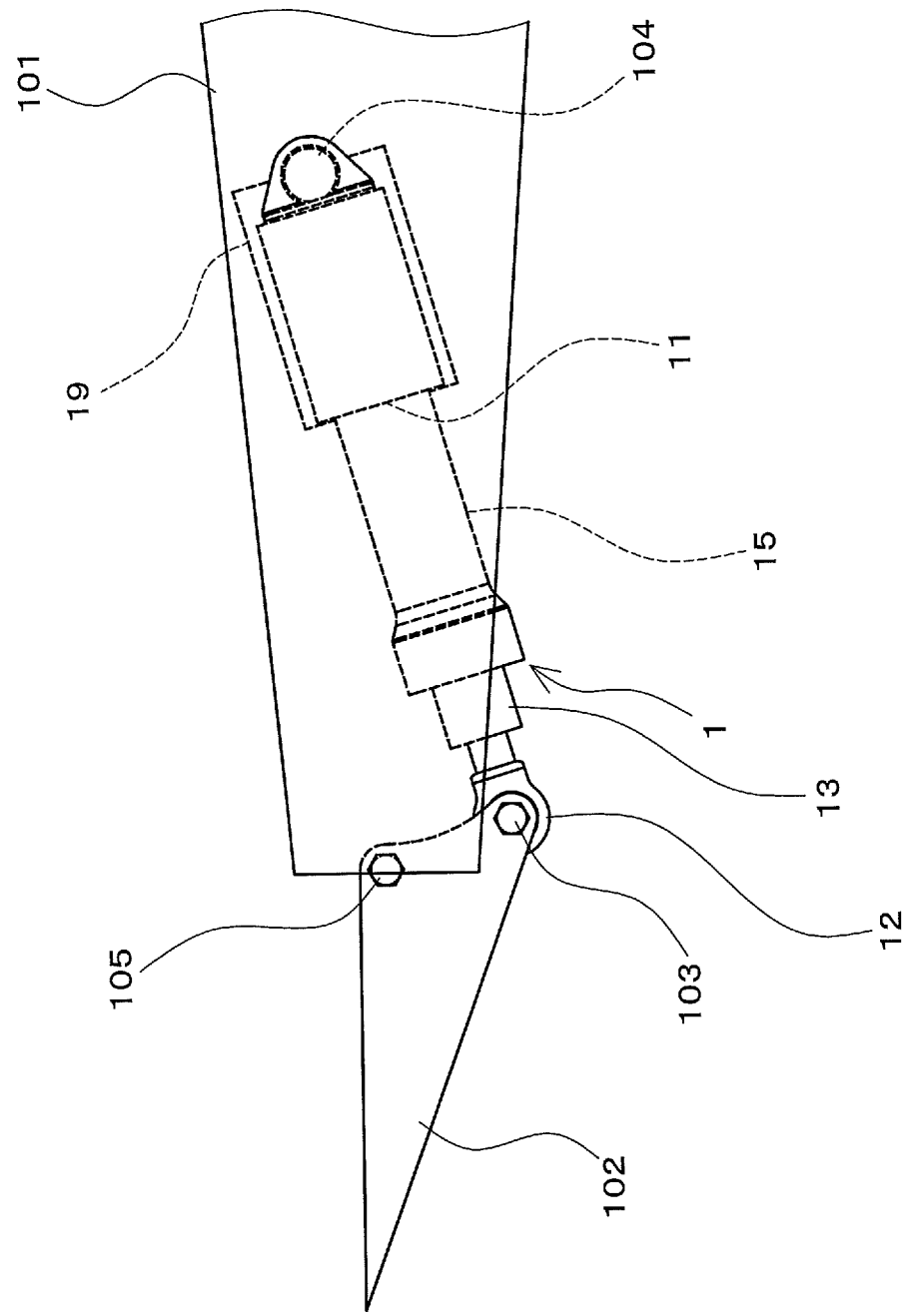
FIG. 1 is a schematic view of an actuator according to one embodiment of the present invention in a state of being attached to a wing and a control surface of an aircraft.

FIG. 1 is a schematic view of an actuator 1 according to an embodiment of the present invention in a state of being attached to a wing 101 and a control surface 102 of an aircraft. The actuator 1 shown in FIG. 1 is installed in the aircraft, whose wing 101 and control surface 102 are shown in FIG. 1 and whose main parts are omitted therein. The actuator 1 is used to drive the control surface 102 of the aircraft.

Note that a moving surface (control surface) of the aircraft that constitutes the control surface 102 may be an aileron, a rudder, an elevator, or the like. The actuator 1 may also be used as a mechanism for driving a moving surface configured as a flap, a spoiler, or the like.

The actuator 1 shown in FIG. 1 is provided as an actuator for driving the control surface 102, which is equipment in the present embodiment, as a result of being displaced so as to linearly expand and contract. An end of the actuator 1 on one end side is rotatably attached, via a bearing or a cylindrical sliding member, to a pivot shaft 103 attached to the control surface 102. Thus the actuator 1 is pivotably attached on one end side thereof to the control surface 102.

An end of the actuator 1 on another end side is rotatably attached, via a bearing or a bush serving as a cylindrical sliding member, to a connecting shaft 104 attached to the wing 101. Thus the actuator 1 is supported rotatably with respect to the wing 101 via the connecting shaft 104.

The control surface 102 is rotatably supported with respect to the wing 101 side via a fulcrum shaft 105. The fulcrum shaft 105 and the pivot shaft 103 are provided so that the axial directions of those shafts are parallel to each other. The distance between the fulcrum shaft 105 and the pivot shaft 103 is set as appropriate so as to be able to secure the length of a torque arm necessary to pivot the pivot shaft 103 around the fulcrum shaft 105 and drive the control surface 102 by the operation of the actuator 1.

Note that a reaction link that is pivotably attached on one end side to the fulcrum shaft 105 and is pivotably attached on another end side to the connecting shaft 104 may further be installed. By installing this reaction link, a load applied to the control surface 102 on the movable side that pivots with respect to the wing 101 can be prevented from directly affecting the wing 101 on the fixed side by which the control surface 102 is pivotably supported.

Figure 2:
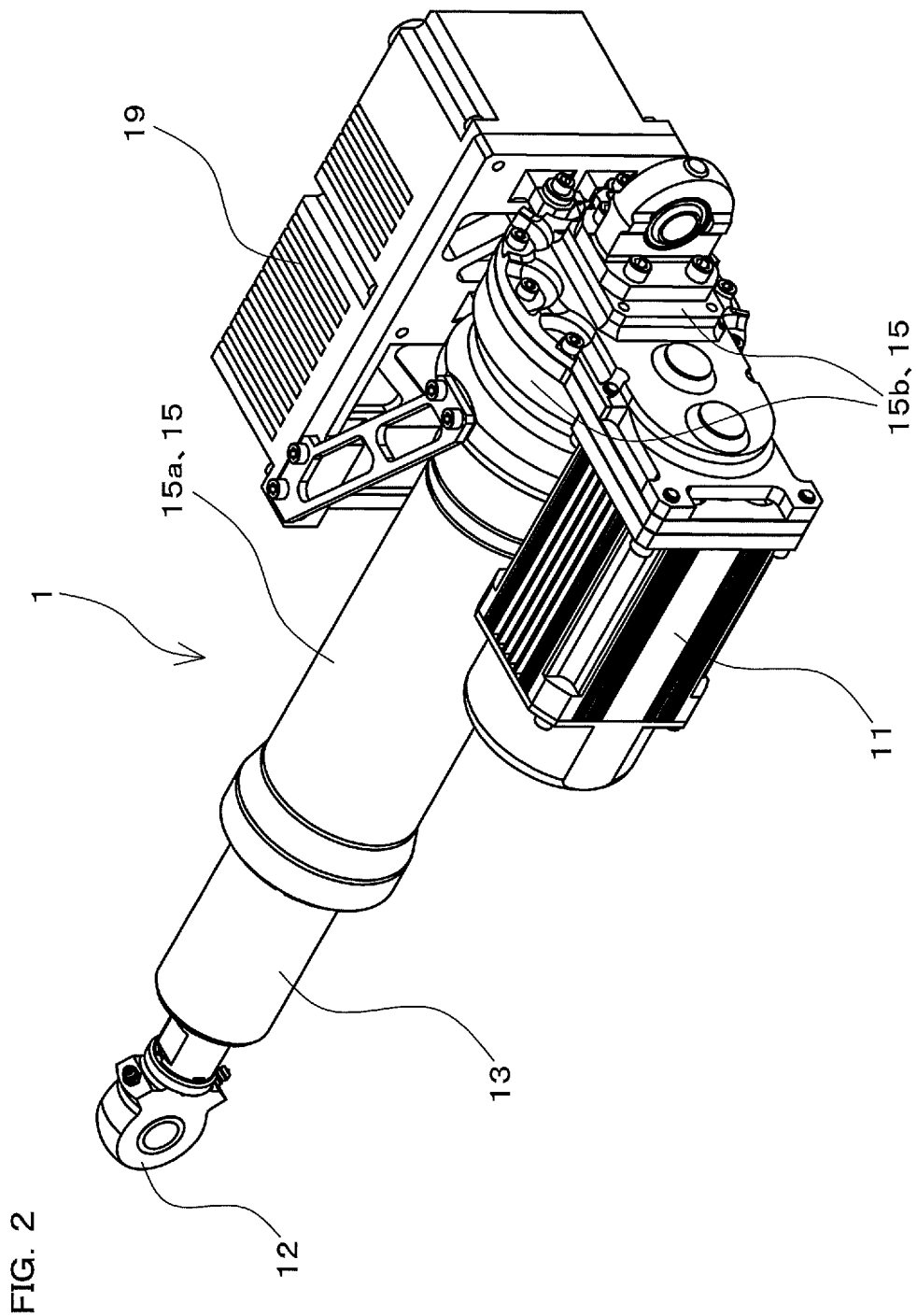
FIG. 2 is an oblique view of the actuator shown in FIG. 1.
Figure 3:
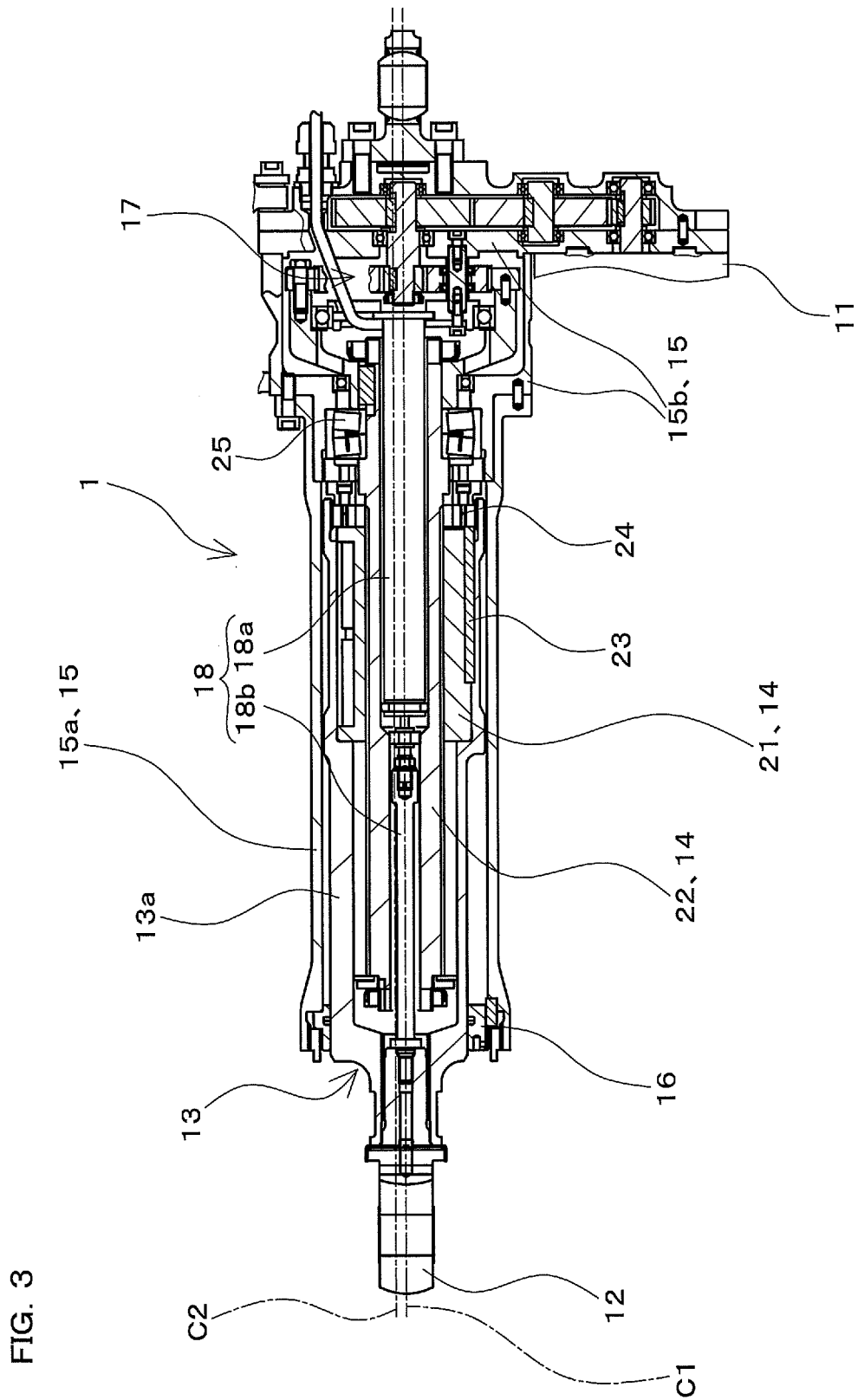
FIG. 3 is a cross-sectional view of the actuator shown in FIG. 2.

Next, the actuator 1 according to the present embodiment will be described in detail. FIG. 2 is an oblique view of the actuator 1. FIG. 3 is a cross-sectional view of the actuator 1. The actuator 1 shown in FIGS. 1 to 3 are provided as an actuator that converts a direction of action of driving force between a rotational direction and a linear direction and drive the control surface 102. The actuator 1 is provided with an electric motor 11, an output portion 12, a piston 13, a driving force conversion mechanism 14, a case 15, a bush 16, a gear mechanism 17, a position detector 18, and so on. Note that in FIG. 3, part of the elements are shown entirely or partially not by the cross section but by the outer shape.

The electric motor 11 is provided as a driving power source for generating rotational driving force upon current being supplied from a power source (not shown in the drawings) via a driver 19. The electric motor 11 constitutes a rotational drive portion in the present embodiment. The electric motor 11 is configured as a motor capable of forward and reverse rotation, and feedback control is performed based on an instruction from an actuator controller 20, which will be described later.

Note that the electric motor 11 is controlled by the actuator controller 20 via the driver 19. The driver 19 controls the current supplied to the electric motor 11 and the number of rotations of the electric motor 11 based on the instruction from the actuator controller 20, and drives the electric motor 11. The electric motor 11 and the driver 19 are fixed to the case 15.

The output portion 12 is provided as a portion that outputs linear driving force, and is pivotably attached to the pivot shaft 103. The output portion 12 constitutes a linear drive portion in the present embodiment that outputs linear driving force when the electric motor 11, which serves as the rotational drive portion, generates rotational driving force.

In the present embodiment, the rotational drive portion provided as the electric motor 11 generates rotational driving force, and the linear drive portion provided as the output portion 12 outputs linear driving force, as described above. However, the input-output structure of the rotational drive portion and the linear drive portion is not limited to the above example, and a mode employing a reverse input-output structure may alternatively be implemented. For example, an actuator configured so that a linear drive portion provided as a cylinder mechanism that operates upon a pressure fluid being fed and discharged thereto/therefrom generates linear driving force, and a rotational drive portion provided as a rotary shaft portion outputs rotational driving force may be implemented.

The piston 13 has a tubular portion 13a provided as a tubular portion having an opening at one end, and is provided as a member that is linearly displaced with the output portion 12. The piston 13 is fixed to the output portion 12 at the other end opposite the opening side. Inside the tubular portion 13a of the piston 13, the driving force conversion mechanism 14 and the position detector 18, which will be described later, are housed. Note that although the present embodiment is described, taking, as an example, the mode in which the piston 13 is fixed to the output portion 12, this need not be the case. A mode in which the piston 13 is integrated with the output portion 12 may alternatively be implemented.

Figure 4:
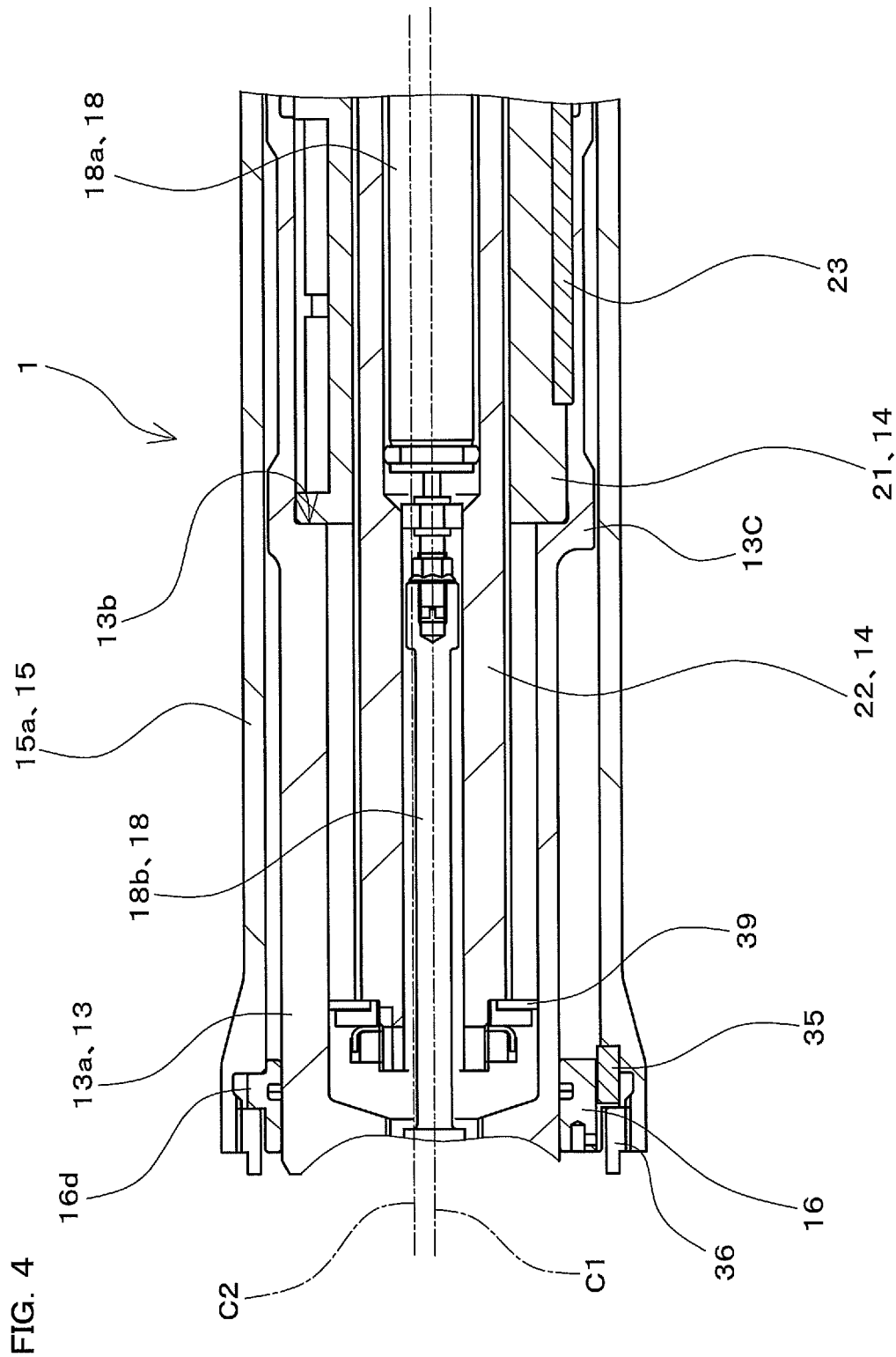
FIG. 4 is a partial enlarged cross-sectional view of the actuator shown in FIG. 3.

FIG. 4 is a partial enlarged cross-sectional view of the actuator 1 shown in FIG. 3, enlarging the area where the piston 13 and the driving force conversion mechanism 14 are installed in the actuator 1. The driving force conversion mechanism 14 shown in FIGS. 3 and 4 has a nut portion 21 and a screw portion 22, and is provided as a mechanism for converting a direction of action of driving force between a rotational direction and a linear direction and transmitting the driving force as a result of relative rotation of the nut portion 21 and the screw portion 22.

In the present embodiment, the driving force conversion mechanism 14 includes the nut portion 21 and the screw portion 22 that are provided so as to be able to rotate relatively to each other around the same axis, and a plurality of balls provided between the nut portion 21 and the screw portion 22. In other words, in the present embodiment, the driving force conversion mechanism 14 is provided as a ball screw mechanism, in which the balls are configured to circulate while rolling between an inner circumferential thread groove provided on the nut portion 21 and an outer circumferential thread groove provided on the screw portion 22. Note that in FIGS. 3 and 4, the balls between the nut portion 21 and the screw portion 22 and the thread grooves on the nut portion 21 and the screw portion 22 are omitted.

The nut portion 21 is installed within the tubular portion 13a of the piston 13. On the inner circumference of the tubular portion 13a and the outer circumference of the nut portion 21, keyways are formed into which a key member 23 is fitted. In other words, the piston 13 and the nut portion 21 are coupled with each other by a key coupling via the key member 23. Thus the piston 13 and the nut portion 21 are non-rotatably fixed to each other.

On the inner circumferential wall of the tubular portion 13a, a step portion 13b is formed so that the diameter of the wall shorten stepwise toward the output portion 12 side in the axial direction of the piston 13. The nut portion 21 is installed inside the tubular portion 13a in a state where an end of the nut portion 21 located on the output portion 12 side abuts against the step portion 13b of the tubular portion 13a. A ring nut 24 is attached to the tubular portion 13a from the side opposite the output portion 12 side, and the nut portion 21 is thereby fixed to the piston 13 also in the axial direction thereof.

Note that the tubular portion 13a is provided with an inner circumferential internal thread portion at the end opposite the output portion 12 side in the axial direction of the piston 13. The ring nut 24 provided with an outer circumferential external thread portion is attached to the tubular portion 13a so as to be screwed with the inner circumferential internal thread portion of the tubular portion 13a. Thus the nut portion 21 abutting against the step portion 13b is fastened by the ring nut 24 screwed with the inner circumference of the tubular portion 13a, and is thus fixed to the piston 13.

As described above, in the present embodiment, the nut portion 21, which is one of the nut portion 21 and the screw portion 22, is provided so as to be fixed to, and displaced with, the piston 13.

The screw portion 22 is located inside the tubular portion 13a of the piston 13. The screw portion 22 is rotatably supported via a bearing 25 with respect to the case 15 so as to be held thereby in a cantilevered manner. The screw portion 22 is internally provided with a through hole extending to pass therethrough in the axial direction. In this through hole, the position detector 18, which will be described later, is installed. In the present embodiment, the screw portion 22, which is the other of the nut portion 21 and the screw portion 22, is provided so as to rotate in conjunction with the electric motor 11 serving as the rotational drive portion via the gear mechanism 17, which will be described later.

Note that the driving force conversion mechanism 14 need only be a mechanism that converts the direction of action of driving force between a rotational direction and a linear direction and transmits the driving force as a result of relative rotation of the nut portion and the screw portion, and may alternatively be configured as a mechanism other than the ball screw mechanism. For example, it may be configured as an acme screw mechanism or a roller screw mechanism.

The case 15 shown in FIGS. 1 to 4 includes a piston case portion 15a and a gear case portion 15b. The piston case portion 15a is provided as a tubular portion in the case 15, and the piston 13 and the driving force conversion mechanism 14 are installed therewithin. One end of the piston case portion 15a is provided so as to be open outward. An end of the piston 13 located inside the piston case portion 15a projects outward from the opening at the end of the piston case portion 15a. To the end of the piston 13 projecting from the piston case portion 15a, the output portion 12 is fixed.

The gear case portion 15b is fixed to the piston case portion 15a at the end of the piston case portion 15a on the side opposite the side on which the piston 13 projects. Inside the gear case portion 15b, the gear mechanism 17 is installed.

Figure 5:
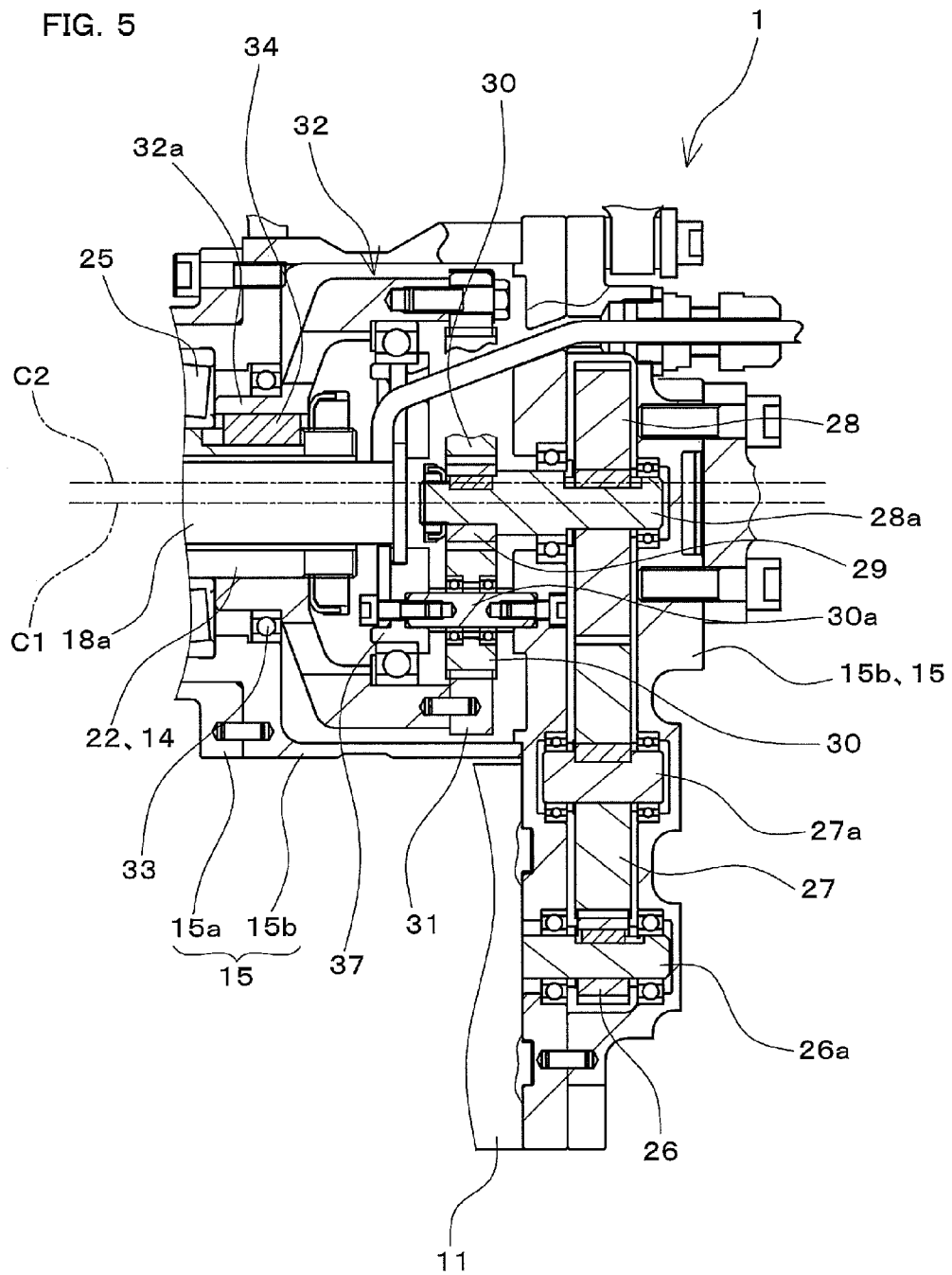
FIG. 5 is a partial enlarged cross-sectional view of the actuator shown in FIG. 3.

FIG. 5 is a partial enlarged cross-sectional view of the actuator 1 shown in FIG. 3, enlarging the area where the gear mechanism 17 is installed in the actuator 1. The gear mechanism 17 shown in FIGS. 3 and 5 is provided as a rotational driving force transmission mechanism in the present embodiment for transmitting rotational driving force of the electric motor 11 to the screw portion 22. In the present embodiment, the gear mechanism 17 is provided as a speed reduction mechanism for decelerating rotation of the electric motor 11 to transmit the rotation. The gear mechanism 17 is provided with an input gear 26 to which the rotation of the electric motor 11 is input, spur gears (27, 28), a sun gear 29, planetary gears 30, a ring gear 31, a rotary tubular portion 32, and so on.

The input gear 26 is fixed to an input shaft 26a, and the rotation of the electric motor 11 is transmitted to the input gear 26 via the input shaft 26a. The input gear 26 is installed so as to be meshed with the spur gear 27 fixed to a rotary shaft 27a rotatably supported with respect to the gear case portion 15b. Furthermore, the spur gear 27 is installed so as to be meshed with the spur gear 28 fixed to a rotary shaft 28a rotatably supported with respect to the gear case portion 15b.

The spur gear 28 is fixed to one end of the rotary shaft 28a, and the sun gear 29 is fixed to the other end of the rotary shaft 28a. A plurality of the planetary gears 30 are installed around the sun gear 29, and each planetary gear 30 is installed so as to be meshed with the sun gear 29. Note that each planetary gear 30 is rotatably supported with respect to a rotary shaft 30a fixed to the gear case portion 15b, and is installed so as not to move circumferentially around the sun gear 29. In addition, each planetary gear 30 is installed so as to be meshed with an inner circumferential internal gear provided on the ring gear 31.

The ring gear 31 is fixed to an end of the rotary tubular portion 32, which is formed in a tubular shape, via a bolt member. The rotary tubular portion 32 is provided with a diameter-shortening portion 32a whose outside diameter shortens stepwise toward the screw portion 22 side. The rotary tubular portion 32 is rotatably supported at this diameter-shortening portion 32a with respect to the gear case portion 15b via a bearing 33. The rotary tubular portion 32 is fixed, inside the diameter-shortening portion 32a, to the outer circumference of the screw portion 22 by a key coupling via a key member 34. The axis of the ring gear 31 and the rotary tubular portion 32, the axis of the rotary shaft 28a to which the sun gear 28 is attached, and the axis of the screw portion 22 coincide with one another.

In the gear mechanism 17 configured as above, firstly, rotational driving force of the electric motor 11 is input to the input gear 26 via the input shaft 26a. Then, the rotation of the electric motor 11 is decelerated and transmitted to the spur gear 27 through meshing between the input gear 26 and the spur gear 27. The rotation transmitted to the spur gear 27 is transmitted to the spur gear 28 that is meshed with the spur gear 27, and is further transmitted to the sun gear 29 via the rotary shaft 28a that rotates with the spur gear 28.

Upon the sun gear 29 rotating with the rotary shaft 28a, this rotation is decelerated and transmitted to the ring gear 31 via the planetary gears 30 meshed with the sun gear 29. Thus the ring gear 31 rotates with the rotary tubular portion 32 with respect to the gear case portion 15b around the axis of the rotary shaft 28a and the screw portion 22 as the center of rotation. With the rotation of the rotary tubular portion 32, the screw portion 22 fixed to the rotary tubular portion 32 by a key coupling also rotates.

As above, the screw portion 22 is configured to rotate in conjunction with the electric motor 11 serving as the rotational drive portion, via the gear mechanism 17 serving as the rotational driving force transmission mechanism. Note that although the present embodiment has been described, taking, as an example, the mode in which the rotational driving force transmission mechanism is configured as the gear mechanism, this need not be the case. For example, the rotational driving force transmission mechanism may alternatively be provided as a mechanism having a circling driving belt. Furthermore, the gear mechanism serving as the rotational driving force transmission mechanism is not limited to the above-described mode of the gear mechanism 17, and may be variously modified for implementation. Furthermore, the screw portion 22 may be configured to rotate with the electric motor 11 serving as the rotational drive portion, and not via the rotational driving force transmission mechanism. In other words, the rotational driving force of the electric motor 11 may be directly transmitted to the screw portion 22.

Figure 6:
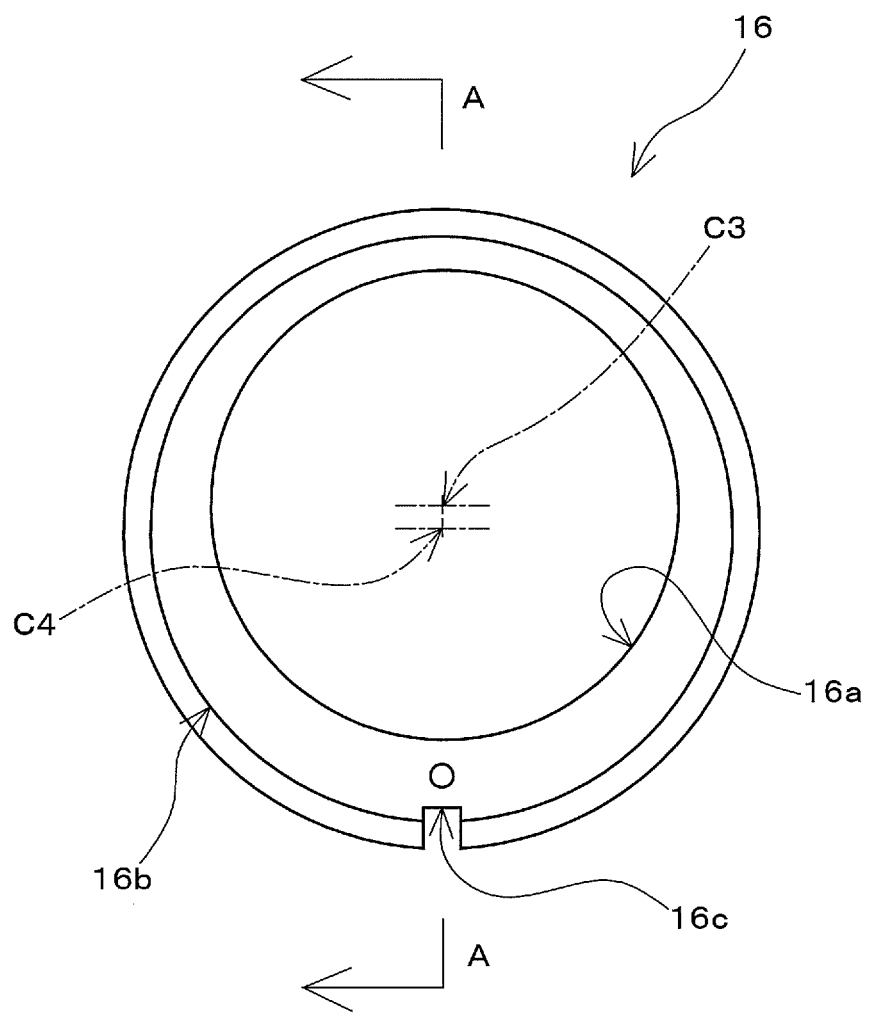
FIG. 6 is a plan view of a bush, which serves as a piston sliding portion in the actuator shown in FIG. 3.
Figure 7:
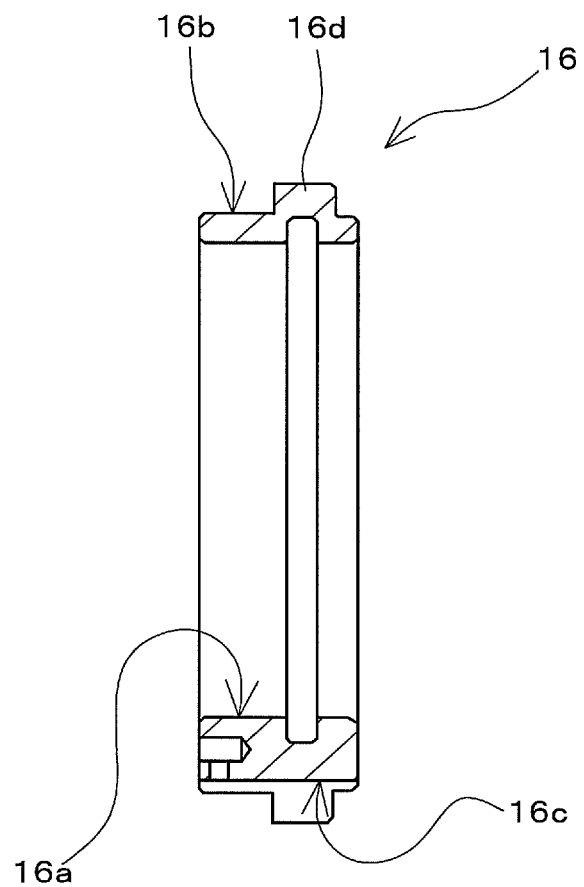
FIG. 7 is a cross-sectional view, viewed along arrows A-A in FIG. 6.

FIG. 6 is a plan view of the bush 16. FIG. 7 is a cross-sectional view of the bush 16, viewed along arrows A-A in FIG. 6A. The bush 16 shown in FIGS. 3, 4, 6, and 7 is provided inside an end of the piston case portion 15a of the case 15 on the output portion 12 side, and is fixed to the piston case portion 15a. The bush 16 is provided as a tubular sliding member having a circular cross section, and is installed between the piston case portion 15a of the case 15 and the tubular portion 13a of the piston 13. The inner circumference 16a of the bush 16 is slidable with respect to the outer circumference of the piston 13, and the outer circumference 16b of the bush 16 is fixed to the case 15. Thus the bush 16 is configured as a piston sliding portion in the present embodiment that has an inner circumference 16a slidably supporting the outer circumference of the piston 13.

Note that the piston 13 and the case 15 are made of, for example, stainless steel. Meanwhile, the bush 16 is made of, for example, nickel aluminum bronze. As the material of the bush 16, metal material such as beryllium copper, resin material such as polyetheretherketone, or the like may alternatively be selected.

On the outer circumference 16b of the bush 16, a keyway 16c into which a key member 35 is fitted is formed. On the inner circumference of the piston case portion 15a at its end on the output portion 12 side as well, a keyway into which the key member 35 is fitted is formed. Thus the outer circumference 16b of the bush 16 is fixed to the inner circumference of the piston case portion 15a by a key coupling via the key member 35.

The outer circumference 16b of the bush 16 is provided with a step portion 16d that projects in a short distance in the radial direction of the bush 16 to form a flange and extends along the circumferential direction of the bush 16. The bush 16, whose circumferential displacement relative to the inner circumference of the piston case portion 15a is restrained by a key coupling, is installed so as to abut at its step portion 16d against a portion on the inner circumference of the piston case portion 15a at which the diameter thereof shortens stepwise. In this state, the bush 16 is fixed to the piston case portion 15a also in the axial direction by the ring nut 36 having an outer circumferential external thread portion screwed with an inner circumferential internal thread portion provided at the end of the piston case portion 15a on the output portion 12 side. In other words, the step portion 16d of the bush 16 is fastened between the ring nut 36 and the portion on the inner circumference of the piston case portion 15a where the diameter thereof shortens stepwise, and the bush 16 is thus fixed to the piston case portion 15a.

Furthermore, as shown in FIG. 6, a central position C3 (position C3 shown by chain line intersection in FIG. 6) of the inner circumference 16a of the bush 16 is eccentric with respect to a central position C4 (position C4 shown by chain line intersection in FIG. 6) on the outer circumference 16b of the bush 16. In other words, the central position C3 on the inner circumference 16a of the bush 16 on the circular cross section is located at a position that is eccentric and shifted with respect to the central position C4 on the outer circumference 16b on the circular cross section.

In the actuator 1, the piston 13 is installed so as to be able to slide in the axial direction of the case 15 with respect to the bush 16 serving as the piston sliding portion. In other words, the actuator 1 is configured so that the outer circumference of the tubular portion 13a having the circular cross section slides in the axial direction of the piston case portion 15a with respect to the inner circumference 16a of the bush 16. Furthermore, in the actuator 1, the positions of the axis of the screw portion 22 and the axis of the nut portion 21 coincide with the position of the axis of the piston case portion 15a of the case 15. Note that the axis of the screw portion 22 and the axis of the nut portion 21 are shown by a chain line C1 in FIGS. 3 to 5, and will also be hereinafter referred to as the axis C1 of the screw portion 22 and the axis C1 of the nut portion 21, respectively.

With the above configuration, in the actuator 1, the axis C2 of the tubular portion 13a of the piston 13 is set to be eccentric with respect to the axis C1 of the screw portion 22 and the axis C1 of the nut portion 21. The central position C3 of the inner circumference 16a of the bush 16 is also set to be eccentric with respect to the axis C1 of the screw portion 22 and the axis C1 of the nut portion 21. Note that in FIGS. 3 to 5, the axis C2 of the tubular portion 13a of the piston 13 is shown by a chain line, and is configured as a virtual central line extending along the radial center of the outer circumference of the tubular portion 13a. The central position C3 of the inner circumference 16a of the bush 16 is located on the axis C2 of the tubular portion 13a of the piston 13. Meanwhile, the central position C4 of the outer circumference 16b of the bush 16 is located on the axis C1 of the screw portion 22 and the axis C1 of the nut portion 21.

Note that in the actuator 1, a convex portion 13c that convexly projects radially outward of the tubular portion 13a is provided in the middle position in the axial direction of the tubular portion 13a on the outer circumference of the tubular portion 13a of the piston 13. The convex portion 13c is provided so as to extend circumferentially along the outer circumference of the tubular portion 13a. The outer circumference of the convex portion 13c is slidably installed in the inner circumference of the piston case portion 15a. The piston 13 is installed so as to be able to slide in the axial direction of the piston case portion 15a also by means of the convex portion 13c.

The position detector 18 shown in FIGS. 3 to 5 has a main body portion 18a and a probe 18b that is displaced with respect to this main body portion 18a, and is provided as a mechanism for detecting the position of the probe 18b relative to the main body portion 18a. The main body portion 18a has a tubular portion, and is installed so that one end thereof is fixed to a support plate 37 fixed to the gear case portion 15b. Note that the support plate 37 is fixed to the gear case portion 15b by the rotary shafts 30a that rotatably support the respective planetary gears 30 in the middle positions. Between the outer circumference of the support plate 37 and the inner circumference of the rotary tubular portion 32, a bearing 38 that rotatably holds, from the inside, the rotary tubular portion 32 with respect to the support plate 37 is installed.

The main body portion 18a is supported in a cantilevered manner with respect to the support plate 37, and is installed so as to extend along the axial direction of the screw portion 22 in the through hole that passes through within the screw portion 22. Note that a gap is formed between the outer circumference of the main body portion 18a and the inner circumference of the screw portion 22. Thus the main body portion 18a and the screw portion 22 are configured so as not to come into contact with each other. Furthermore, the main body portion 18a is internally provided with primary-side and secondary-side coils.

The probe 18b has a shaft-like portion, and one end thereof provided with a movable core, which is not shown in the drawings, is located within the main body portion 18a. The probe 18b is installed so as to extend along the axial direction of the screw portion 22 in the through hole within the screw portion 22. Furthermore, the other end of the probe 18b projects from an end of the screw portion 22 and is fixed to an end of the piston 13 from the inside of the piston 13. Thus the probe 18b is attached to the output portion 12 via the piston 13, and is displaced with the output portion 12. As a result of the probe 18b being displaced with the output portion 12, the movable core provided at one end of the probe 18b is relatively displaced within the coils of the main body portion 18a. With the above configuration, the position detector 18 is configured to detect a displacement of the output portion 12 with respect to the housing 15.

Figure 8:
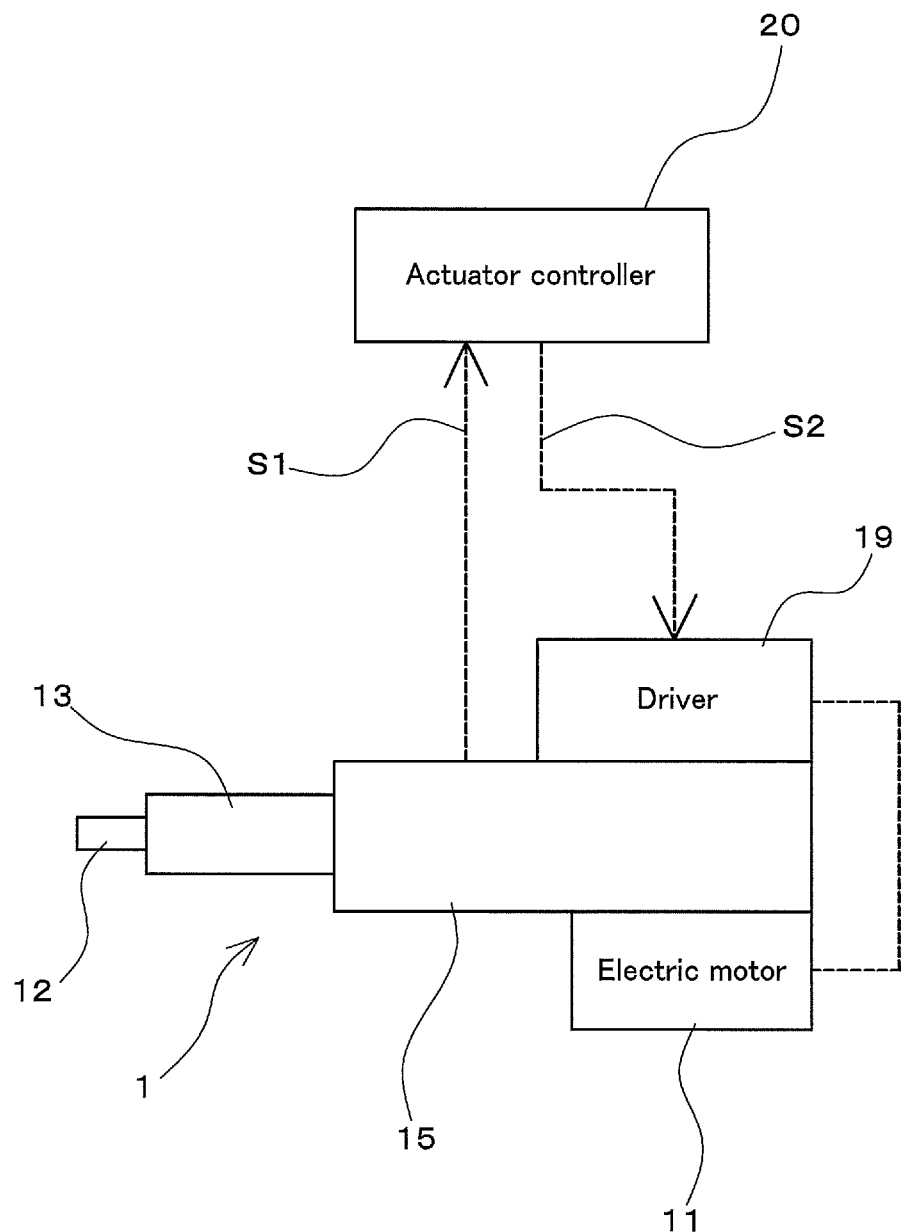
FIG. 8 is a block diagram schematically showing a control structure of the actuator shown in FIG. 2.

FIG. 8 is a block diagram schematically showing a control structure of the actuator 1. The actuator controller 20 controls operation of the actuator 1 via the driver 19. The actuator controller 20 controls the actuator 1 based on an instruction signal from a superordinate computer, which is not shown in the drawings. Thus operation of the control surface 102 driven by the actuator 1 is controlled based on the instruction from the superordinate computer.

Furthermore, in the position detector 18, a position detection signal S1 is output that is a signal based on induced voltage generated by the secondary-side coil of the main body portion 18a as a result of the movable core of the probe 18b being displaced in a state where the primary-side coil of the main body portion 18a is excited. The output position detection signal S1 is transmitted to the actuator controller 20 (see FIG. 8).

To the actuator controller 20, not only the position detection signal S1 transmitted from the position detector 18 is input, but also a rotation number signal detected by a rotation number detector such as a resolver in the electric motor 11 is transmitted and input from the electric motor 11 via the driver 19. The actuator controller 20 outputs a command signal S2 for driving the electric motor 11 to the driver 19, based on the position detection signal S1 and the above-mentioned rotation number signal. Thus the actuator controller 20 controls the number of rotations of the electric motor 11 via the driver 19, and performs feedback control of the position of the output portion 12 relative to the case 15.

Next, operation of the actuator 1 will be discussed. Upon the electric motor 11 generating rotational driving force, the input gear 26 rotates with the input shaft 26a. The rotation input to the input gear 26 is then transmitted to the sun gear 29 via the spur gears 27 and 28 and the rotary shaft 28a. The rotation transmitted to the sun gear 29 is further transmitted to the ring gear 31 via the planetary gears 30. The rotary tubular portion 32 thereby rotates with the ring gear 31, and the screw portion 22 fixed to the rotary tubular portion 32 via the key member 34 rotates around the axis C1.

Then, as a result of the screw portion 22 rotating in the driving force conversion mechanism 14, the nut portion 21 is driven via the balls circulating between the screw portion 22 and the nut portion 21. Meanwhile, the nut portion 21 is fixed on the inner circumference of the piston 13. The piston 13 fixed to the output portion 12, which serves as the linear drive portion, is installed so as to be able to slide in the axial direction with respect to the bush 16, which serves as the piston sliding portion fixed to the case 15. The axis C2 of this piston 13 and the central position C3 of the inner circumference 16a of the bush 16 that slidably supports the outer circumference of the piston 13 are set to be eccentric with respect to the axis C1 of the screw portion 22 and the nut portion 21.

Due to the above-described configuration, when the nut portion 21 is driven by the rotation of the screw portion 22, rotational displacement of the piston 13 around its axis C2 is restricted. Rotation of the tubular portion 13a of the piston 13 around the axis C1 of the nut portion 21 and the screw portion 22 is also restricted. Thus, when the screw portion 22 rotates, the piston 13 restricts the rotation of the nut portion 21 and is linearly displaced with the nut portion 21. Note that a linear displacement of the nut portion 21 and the piston 13 toward the output portion 12 side is restricted by a stopper ring 39 that is fixed to an end of the screw portion 22 on the output portion 12 side and is able to come into contact with an end of the nut portion 21.

Upon the piston 13 being linearly displaced along the axial direction with respect to the case 15, the control surface 102, to which the output portion 12 fixed to the piston 13 is pivotably attached, is driven to pivot with respect to the wing 101.

As described above, with the actuator 1, the mechanism for restricting rotation of the linearly displaced element, which is one of the nut portion 21 and the screw portion 22 (the nut portion 21 in the present embodiment), can be configured by the piston 13 whose axis is eccentric with respect to the screw portion 22 and the nut portion 21 within the case 15, and thus can be made simpler and smaller. According to the present embodiment, with the above configuration, the structure of the actuator 1 can be made simpler and smaller, increase in the weight of the actuator 1 can be suppressed, and the installation space for the actuator 1 can be made more compact.

Furthermore, with the actuator 1, it is possible to easily achieve the piston sliding portion for supporting the piston 13 whose axis is eccentric with respect to the nut portion 21 and the screw portion 22, in a state where the piston 13 can slide in the axial direction with respect to the case 15 and the rotational displacement of the piston 13 is restricted. In other words, with the actuator 1, the above-described mechanism can be easily achieved only by installing, between the case 15 and the piston 13, the bush 16 whose central position C3 of the inner circumference 16a is eccentric with respect to the central position C4 of the outer circumference 16b. Consequently, the mechanism for restricting the rotation of the linearly displaced element, which is one of the nut portion 21 and the screw portion 22, can be made further simpler and smaller. Furthermore, according to the present embodiment, it is possible to establish the mechanism for restricting the above-described rotation by placing the bush 16 that constitutes the piston sliding portion between the case 15 and piston 13, and therefore, assembly of the actuator 1 can also be performed easily.

Furthermore, with the actuator 1, the bush 16 can be easily fixed by a key coupling within the case 15. Accordingly, it is possible to further easily achieve the mechanism for installing the piston 13 whose axis is eccentric with respect to the nut portion 21 and the screw portion 22 in a state where the piston 13 can slide in the axial direction with respect to the case 15 and the rotational displacement of the piston 13 is restricted, and the mechanism can be made further simpler and smaller. Furthermore, according to the present embodiment, installation of the bush 16 within the case 15 can be further easily performed.

Furthermore, in the actuator 1, the driving force conversion mechanism 14 is housed within the cylindrical piston 13, and it is therefore possible to easily prevent foreign matter from entering the area where the nut portion 21 and the screw portion 22 are installed. It is thus possible to suppress jamming due to foreign matter getting stuck in the nut portion 21 and the screw portion 22. Furthermore, according to the present embodiment, the area within the piston 13 is efficiently used, and it is therefore possible to provide the further compact, space-efficient actuator 1 whose structure is further made smaller.

Furthermore, according to the present embodiment, the structure of the actuator 1 that converts the direction of action of rotational driving force and outputs linear driving force can be made simpler and smaller. Furthermore, according to the present embodiment, the nut portion 21 and the piston 13 that is displaced with the output portion 12 serving as the linear drive portion are provided on the output side in the driving force transmission path. Therefore, a force generated in a rotational direction around the axis C1 of the nut portion 21 and the screw portion 22 by a large driving force acting on the output side in the driving force transmission path can be efficiently distributed and supported on the inner circumference of the cylindrical piston case portion 15a of the case 15.

Although one embodiment of the present invention has been described thus far, the present invention is not limited to the embodiment described above, and various modifications may be made within the scope recited in the claims. For example, the following modifications are possible.

(1) Although the above embodiment has been described, taking, as an example of the actuator, an electromechanical actuator driven by the electric motor, this need not be the case. An actuator that operates by means of any kind of pressure fluid, such as one having a hydraulic motor or a hydraulic cylinder mechanism, may alternatively be implemented.

(2) Although the above embodiment has been described, taking, as an example, the mode in which the rotational drive portion generates rotational driving force and the linear drive portion outputs linear driving force, this need not be the case. An actuator in which the linear drive portion generates linear driving force and the rotational drive portion outputs rotational driving force may alternatively be implemented. In this case, the driving force conversion mechanism converts the direction of action of linear driving force generated by the linear drive portion into a rotational direction.

(3) Although the above embodiment has been described, taking, as an example, the mode in which the piston sliding portion is fixed to the case, this need not be the case. A mode in which the piston sliding portion is integrated with the case may alternatively be implemented.

(4) Although the above embodiment has been described, taking, as an example, the mode in which the nut portion is provided so as to be displaced with the piston, and the screw portion is provided so as to operate in conjunction with the rotational drive portion via the rotational driving force transmission mechanism, this need not be the case. A mode in which the screw portion is provided so as to be displaced with the piston, and the nut portion rotates with the rotational drive portion or operates in conjunction with the rotational drive portion via the rotational driving force transmission mechanism may alternatively be implemented.

The present invention can be widely applied to actuators that convert a direction of action of driving force between a rotational direction and a linear direction and drive equipment. The present invention is not limited to the above-described embodiments, and all modifications, applications and equivalents thereof that fall within the claims, for which modifications and applications would become apparent by reading and understanding the present specification, are intended to be embraced therein.

What is claimed is:

1. An actuator that converts a direction of action of driving force between a rotational direction and a linear direction and drives equipment, the actuator comprising:
   a rotational drive portion that generates or outputs rotational driving force;
   a linear drive portion that outputs linear driving force when the rotational drive portion generates the rotational driving force, or generates linear driving force when the rotational drive portion outputs the rotational driving force;
   a piston integrated with, or fixed to, the linear drive portion, the piston including a tubular portion and a convex portion that convexly projects radially outward of the tubular portion;
   a driving force conversion mechanism that has a nut portion and a screw portion, and converts a direction of action of the driving force between a rotational direction and a linear direction and transmits the driving force as a result of relative rotation of the nut portion and the screw portion;
   a case that has a tubular portion and within which the piston and the driving force conversion mechanism are installed; and
   a piston sliding portion that is provided within the case and integrated with, or fixed to, the case, and has an inner circumference slidably supporting an outer circumference of the piston,
   wherein one of the nut portion and the screw portion is provided so as to be displaced with the piston,
   the other of the nut portion and the screw portion is provided so as to rotate with the rotational drive portion, or rotate in conjunction with the rotational drive portion via a rotational driving force transmission mechanism,
   the piston is installed so as to be able to slide in an axial direction of the case with respect to the piston sliding portion, and
   an axis of the tubular portion of the piston and a central position of the inner circumference of the piston sliding portion are set to be eccentric with respect to an axis of the screw portion and an axis of the nut portion.

2. The actuator according to claim 1,
   wherein the piston sliding portion is provided as a bush installed as a cylindrical sliding member having a circular cross section between the case and the piston,
   the bush has an inner circumference that is slidable with respect to the outer circumference of the piston, and an outer circumference fixed to the case, and
   a central position of the inner circumference of the bush is eccentric with respect to a central portion of the outer circumference of the bush.

3. The actuator according to claim 2,
   wherein the outer circumference of the bush is fixed to an inner circumference of the case by a key coupling.

4. The actuator according to claim 1,
   wherein the piston has the tubular portion, and internally houses the driving force conversion mechanism.

5. The actuator according to claim 1, wherein the rotational drive portion generates rotational driving force, and the linear drive portion outputs linear driving force.

6. An actuator comprising:
   a nut and a screw coupled to each other to convert rotational driving force to linear driving force;
   a piston including a tubular portion configured to output the linear driving force and a convex portion that convexly projects radially outward of the tubular portion;
   a case within which the piston is accommodated; and
   a piston sliding portion provided within the case and including an inner circumference slidably supporting an outer circumference of the tubular portion of the piston,
   wherein an axis of the tubular portion of the piston and a central position of the inner circumference of the piston sliding portion are set to be eccentric with respect to an axis of the screw and an axis of the nut.

* * * * *